United States Patent [19]

Roland

[11] 4,021,902
[45] May 10, 1977

[54] COILED VIBRATORY FEEDER

[76] Inventor: Max G. Roland, 3535 Haven Ave., Menlo Park, Calif. 94025

[22] Filed: June 4, 1976

[21] Appl. No.: 692,871

[52] U.S. Cl. .................. 29/786; 198/347; 221/268; 29/804; 29/809
[51] Int. Cl.² .......................................... B23Q 7/10
[58] Field of Search ............ 29/208 R, 211 R; 221/268, 186, 200; 198/347

[56] References Cited

UNITED STATES PATENTS

| | | | |
|---|---|---|---|
| 2,873,019 | 2/1959 | Kay et al. | 198/347 X |
| 3,226,811 | 1/1966 | Roland | 29/211 R |
| 3,274,673 | 9/1966 | Roland | 29/211 |
| 3,295,666 | 1/1967 | Kay et al. | 198/347 |
| 3,415,356 | 12/1968 | Wakabayashi | 198/347 |
| 3,417,452 | 12/1968 | Roland | 29/211 R X |
| 3,634,920 | 1/1972 | Maguire | 29/211 R X |
| 3,789,490 | 2/1974 | Kohart | 29/211 R |

FOREIGN PATENTS OR APPLICATIONS 819,950  9/1959  United Kingdom .............. 198/347

Primary Examiner—Victor A. DiPalma
Attorney, Agent, or Firm—Larson, Taylor and Hinds

[57] ABSTRACT

A coiled vibrating feeder is provided for individually feeding a plurality of workpieces. An elongated enclosed tubular passageway is formed, preferably by coiling an elongate tube into a bundle having a plurality of generally concentric coil turns and including a charging end for receiving the workpieces to be fed and a discharging end. The coils are circumferentially vibrated about the axis of the bundle by alternating strong forward pulses and weaker return pulses so that the workpieces progress therethrough from the charging to the discharging end. A bonding material such as a plastic material or the like substantially engages all of the coils, thus increasing the rigidity of the bundle of coils, thereby increasing the efficiency of transferring the forces of the vibrations from the vibrator to the coils and hence to the workpieces to more effectively move the latter. Vibrating feeders of this type can be used to feed tumbler lock pins and springs between the machines which make the same and the setting machine. The coils may have a very high capacity which allows the bundle to serve a storage function, and the coils have the additional advantage of maintaining the articles oriented and untangled during storage and transport. For maximum force transfer of the vibrations to material or the like.

14 Claims, 4 Drawing Figures

COILED VIBRATORY FEEDER

BACKGROUND OF THE INVENTION

1. Field of the Invention

This invention relates to vibrating feeders for receiving, storing and individually discharging workpieces, and to such a vibrating feeder, especially for feeding pins and/or springs to a tumbler lock pin setting machine.

2. Description of the Prior Art

A variety of vibrating feeding devices are known. A most common one of these includes a so-called vibrating pan feeder that is generally bowl-shaped with an inclinded ramp spiraling upwardly along the inside of the bowl from the bottom of the bowl to its upper edge. A supply of workpieces such as pins or springs is placed in the feeder which is then subjected to an asymmetrical circumferential vibration. That is to say, the bowl is vibrated circumferentially about its axis by alternating strong forward pulses and weaker return pulses. This vibration causes the workpieces to climb the ramp, one after the other, the ramp being lined with workpieces, so that they may be individually fed, for example, to a pin setting machine. However, this device suffers several disadvantages. Firstly, this type of device cannot uniformly orient the workpieces, as may be necessary when feeding workpieces having one end which differs from the other, such as a tumbler pin having one flat end surface and an opposing rounded end surface or "ball nose". Rather, the vibrating pan feeder can feed only workpieces with identical ends wherein orientation is unimportant. An additional disadvantage of the vibrating pan feeder is that a supply of springs placed in the feeder tend to become tangled with each other, inhibiting the orderly alignment and feeding of the springs end to end along the ramp.

Another type of feeder, various aspects of which are disclosed in German Pat. No. 348,367, U.S.S.R. Pat. No. 127,560, and Western Electric's Technical Digest No. 16 of October, 1969, includes a flat disc with an outwardly spiraling groove formed into the surface thereof. Workpieces are placed in a reservoir at the center of the disc and an asymmetric circumferential vibration applied to the disc causes the workpieces to spiral outwardly along the groove. While the grooves are a slight help for reducing tangling, the tangling and orientation disadvantages of the vibrating pan feeder are still present to a fair degree in this flat disc feeder. These advantages could be mitigated to some extent in the flat disc feeder if the workpieces were placed, preorientated, in the groove instead of being placed in the central reservoir. However, this represents a most inconvenient and expensive task. Further, without a central reservoir, the storage capability of this disc is directly related to its diameter and a large, bulky, and costly-to-machine disc would be needed to store operational quantities of pins or springs. Also, as the size of the disc increased, greater vibrational energies would have to be consumed to overcome the inertia of the disc.

An additional disadvantage common to both of these feeders is that the workpieces are supplied to the central portion of the feeder where the vibrating forces exerted thereon are the weakest.

It is believed that attempts have been made to store and feed workpieces through coiled tubes. It is believed that such attempts have been unsuccessful in that workpieces, such as pins or springs, have too little mass to be efficiently vibrated along the coiled tube without becoming fouled, i.e., jammed up. When fouling occurs, the production line must be shut down and the tubes cleared by forcing, for example, compressed air therethrough. Such fouling reduces production line productivity by increasing production line down time and by producing units that are deficient in parts and must be discarded.

These previous vibrating feeders have proved particularly unsuited to the complex and demanding task of feeding workpieces such as tumbler pins and springs to a tumbler lock pin setting machine.

In order to supply a steady flow of tumbler pins and springs to a tumbler lock pin setting machine such as those disclosed in U.S. Pat. Nos. 3,226,811; 3,274,673; and 3,417,452; a device is needed that can store, orientate and efficiently feed the tumbler springs and tumbler pins. The pins are made with pin making machines that are sometimes referred to as screw machines. These screw machines require substantial capital outlay, but have a pin production rate much greater than that demanded by a tumbler lock pin setting machine. Further, one screw machine can be quickly adjusted to produce the various lengths and shapes of pins that are used in the production of a tumbler lock. Thus, in just a fraction of a production day, a screw machine at its maximum output rate can produce all of the pins of any given size and shape required by the pin setting machine for that day. Consequently, a need arises for a feeding device that can store up to a day's supply of one type of pins, so that the screw machine can be efficiently used at its maximum output rate to produce all of the various sizes and shapes of pins required by the pin setting machine. As a pin setting machine can require ten pin styles and more, a substantial capital outlay savings is realized, in that only one, and not ten screw machines, is needed. Each style of pin can then be stored in its individual feeding device which need be replenished only once or twice during a production day. Also one feeding device can be used to store tumbler springs produced by a spring making machine at a rate many times greater than that required by the pin setting machine. In addition, the pin setting machine will require many asymmetrical pins, all fed properly oriented, end to end, to the machine. The machine will also require springs which obviously must be fed in an untangled state.

Hence, there exists a need, particularly for use with a tumbler lock pin setting machine, of a new and improved feeding mechanism capable of feeding workpieces such as pins and springs, oriented and untangled and which has a high storage capacity.

SUMMARY OF THE INVENTION

The present invention provides a vibrating feeder, for individually feeding a plurality of workpieces and which has a capacity that is so high that it also acts as a means for storing the workpieces. The vibrating feeder of the invention comprises an elongated enclosed tubular passageway preferably formed by coiling an elongate tube to form a bundle having a plurality of generally concentric coils and bonding material substantially engaging all of the coils. The tubular passageway includes a charging end for receiving a plurality of workpieces, one at a time, to be fed and stored, and a discharging end. The coils are mounted as a vibratory motor and are circumferentially vibrated about the axis of the bundle by alternating strong forward pulses and weak return pulses. The workpieces are moved through the coils of the tube by these vibrations from the vibratory motor and are discharged, one at a time, from the discharging end. Increased storage is accomplished quite economically by increasing the number of coils.

Although the vibrating feeder of the invention has many uses, one particularly advantageous use is in conjunction with a tumbler lock pin setting machine, and a pin and a spring making machine. However, it will be understood that the invention is not limited to this use as it is equally advantageous in many other environments such as most of those where vibrating feeders have been used heretofore. The workpieces are the various types of pins and springs. It is further intended that a plurality of feeders, each formed by a bundle of coils with the bonding material substantially engaging all of the coils, would be stacked one above the other, each storing a plurality of a particular pin or spring. Each feeder would have as many coils turns as necessary to store enough pins or springs of a certain style as required to meet production needs. One screw machine can be successively connected to each of a plurality of feeders and supply to each feeder in a relatively short time all the pins of a particular size or style necessary at that time.

The present invention can be directly connected to a screw machine so that as the pins are produced, they are immediately introduced into the charging end of the vibratory feeder. Thus, the orientation of the pin as it exits the screw machine is preserved. Consequently, unlike with prior art vibratory pan and open top disc feeders, pins having, for example, one rounded end surface or "ball nose" can be supplied with the correct orientation to the pin setter via the vibratory feeder of the invention in which such initial orientation is always preserved by the confinement of the inside wall of the coiled tube. Also, since the springs can also be introduced one after the other directly into the vibratory feeder as they are produced by a spring making machine, and since they are effectively moved along the coils and confined in the correct orientation by the walls of the tube, any opportunity for fouling or tangling is reduced.

This invention can be economically produced and does not require that grooves be machined into a disc. Additional storage capacity can be added by increasing the number of coils without increasing the diameter and with little increase in the bulk of the bundle of the feeder.

Also, the coils, as well as the charging and discharging ends of the tube, may be located adjacent the outermost edge of the base. This provided two distinct advantages. First, in comparison to weaker forces on springs and pins located in the central portions as in some prior art devices, maximum forces are continually placed on the springs and pins stored in the present invention so as to keep the pins and springs progressing steadily through the tube from the charging to the discharging end. Secondly, it permits loading of the feeder at the outer periphery rather than at the center, and this may be highly advantageous, e.g., it simplifies attachment of the charging end of the tube directly to a machine from which the workpieces are supplied.

Additionally, the responsiveness of the feeder, and the workpiece therein, to the vibratory forces is enhanced by increasing the rigidity of the bundle of coils with respect to each other and with respect to the vibrating motor by having bonding material substantially engaging all of the coils. For maximum responsiveness, the coils may be embedded in a mass of bonding material that is substantially donut-shaped.

It is therefore an object of this invention to provide a new and improved vibratory feeder.

It is another object of this invention to provide a vibratory feeder having a workpiece path formed by an elongated tubular passageway preferably formed by coiling a tube into a bundle having a plurality of generally concentric coils with bonding material substantially engaging all of the coils.

It is still another object of the invention to provide a vibratory feeder which uniformly maintains the initial orientation of the workpieces and precludes tangling or fouling of workpieces, and which may be made with a very large capacity so as to serve a storage function.

It is still another object of this invention to provide a vibratory feeder for use advantageously in combination with a tumbler lock pin setting machine and the machines for making the pins and springs to be used therewith.

Additional objects and advantages of the invention will now be set forth in, or apparent from, the detailed description of the preferred embodiments of the invention to follow.

DETAILED DESCRIPTION OF THE PREFERRED EMBODIMENTS

Figure 1:
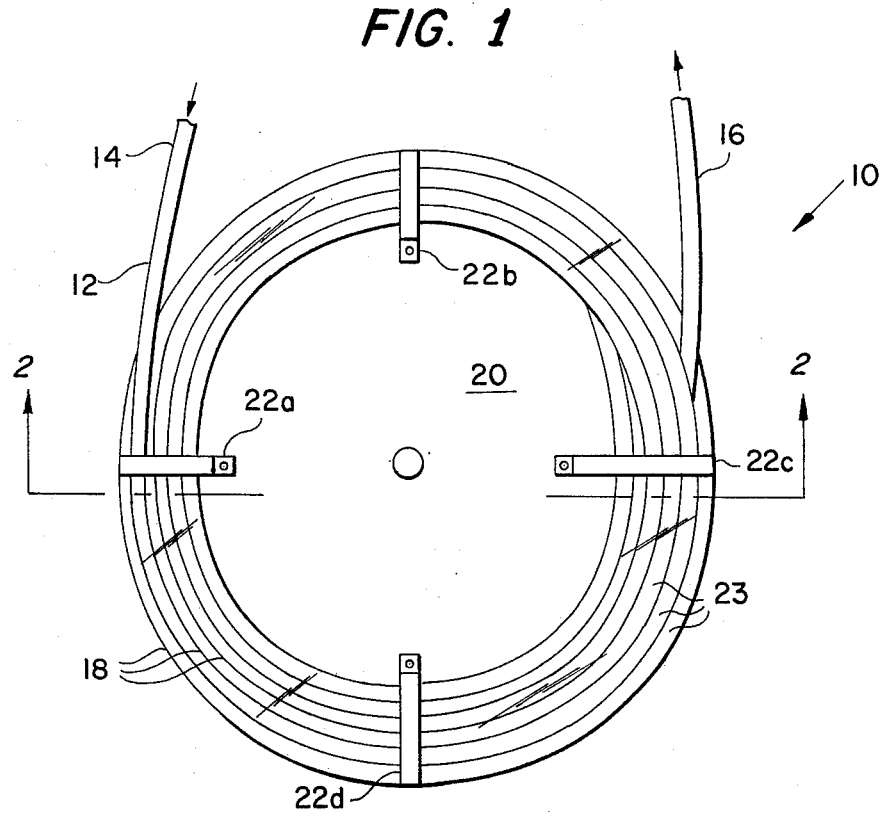
FIG. 1 is a plan view of the coiled vibrating feeder in accordance with the invention.

A coiled vibratory feeder for feeding a plurality of pins or springs to a tumbler lock pin setting machine is provided. With reference to FIG. 1, there is provided the preferred embodiment of coiled vibratory feeder 10. Feeder 10 includes an elongate tube 12 with a charging end 14 and a discharging end 16 and a plurality of coils 18 formed therein. Coils 18 are generally mounted to the outer peripheral portion of a disc-shaped base 20 by any suitable means such as mounting brackets 22a, 22b, 22c and 22d. Also ends 14 and 16 extend from coils 18 adjacent the outer peripheral portion of base 20. As the brackets do not by themselves give coils 18 sufficient rigidity, bonding material 23 is used such that it substantially engages all of the coils 18 by at least filling most of the interstitial spaces between coils 18.

Figure 2:
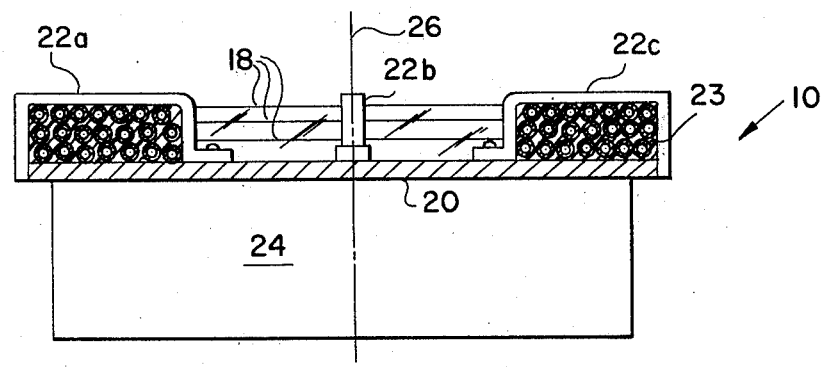
FIG. 2 is a cross-sectional view taken along line 2—2 of FIG. 1.

With reference to FIG. 2, base 20 is depicted mounted upon a vibratory motor represented schematically by block 24. Vibratory motor 24 imparts asymmetrical circumferential vibratory motion to the coils such that the coils are circumferentially vibrated about the axis 26 of the bundle by alternating strong forward pulses and weaker return pulses. Thus, tumbler pins or springs progress uniformly from charging end 14 through coils 18 to discharging end 16.

In one specific embodiment, which was designed as one feeder for feeding tumbler lock pins, 100 coils 18 of 3/16-inch diameter tubing is placed on an approximately 18-inch diameter base. Estimating four pins per inch, approximately 15,000 pins could be stored in such a bundle of coils 18. Additional coils can of course be added to the bundle to increase its storage capacity.

Bonding material 23 can include, for example, glue-like casting material as liquid plexiglass, resin or plaster that fills the interstitial spaces between coils 18 and can provide a coating, though not necessarily uniform over the bundle of coils 18.

The operation of the coiled vibrating feeder is as follows. Workpieces such as pins or springs are introduced into charging end 14 of tube 12. The vibratory motion created by motor 24 causes the pins or springs to progress through tube 12 until they exit at discharging end 16 with the same orientation that the pins or springs had when placed into charging end 14. Although for pins having two flat end surfaces, maintenance of orientation is of little or no importance, for pins which have differently constructed ends, proper orientation is important to insure that the appropriate end is consistently supplied first to the pin setting machine.

The degree of responsiveness of the coils, or more precisely, the workpieces therein, to the vibratory forces can be enhances still further if the bundle of coils is embedded in a mass of bonding material. The smaller the feeder and the larger the mass of the workpieces, the less rigid need be the connection between the coils of the tube and the vibratory motor. Hence, a feeder having very few turns, when feeding relatively large mass items such as large tumbler pins, may work perfectly well with no more than the few brackets and interstitial bonding material shown in FIGS. 1 and 2. However, as the diameter and number of turns increases and/or the feeder is used with lower mass items such as springs, it becomes increasingly necessary to increase the rigidity of the coils with respect to themselves and to the vibratory motor. One may add additional brackets, tighten the brackets, or even add a second plate, like plate 20, into contact with the upper surface of the bundle of coils 18. However, such means are not necessarily efficient because the force with which they can be tightened against the bundle cannot be so great as to constrict the coils. Hence, in cases where there is a need for a significantly increased rigidity, one may employ the means shown and described below with respect to FIG. 3.

Figure 3:
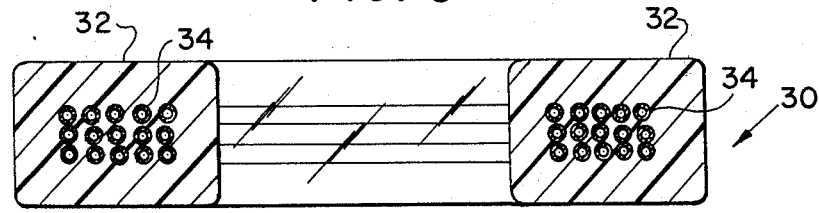
FIG. 3 is a cross-sectional view similar to FIG. 2, but showing another embodiment of the invention.

Referring to FIG. 3, feeder 30 includes tubing coils 34 that have been completely embedded in bonding material 32. Feeder 30 can be mounted on a vibratory motor, such as that previously described. In contrast to the embodiment depicted in FIGS. 1 and 2, coils 34 of the embodiment depicted in FIG. 3 are completely embedded in a glue-like casting or bonding material 32 such as, for example, liquid plexiglass, resin or plaster, that fills the interstitial spaces between coils 34 and provides a mass of material 32 located about the bundle of coils 34.

A plan view (not shown) of the embodiment of FIG. 3 would depict bonding material 32 as being generally donut-shaped, much like the plan view of the embodiment depicted in FIG. 1. It has been determined that with coils 34 rigidly embedded in such a casting material 32, that additional vibratory energy and the forces related thereto are transmitted to coils 34 of feeder 30 so that low mass workpieces, such as springs, can progress through coils 34 without jamming. With higher mass workpieces such as pins, the embodiment depicted in FIGS. 1 and 2 has been found to be sufficient to transfer the vibrational energy needed for successful passage through the feeder. The operation of this embodiment is similar to that of FIGS. 1 and 2.

Figure 4:
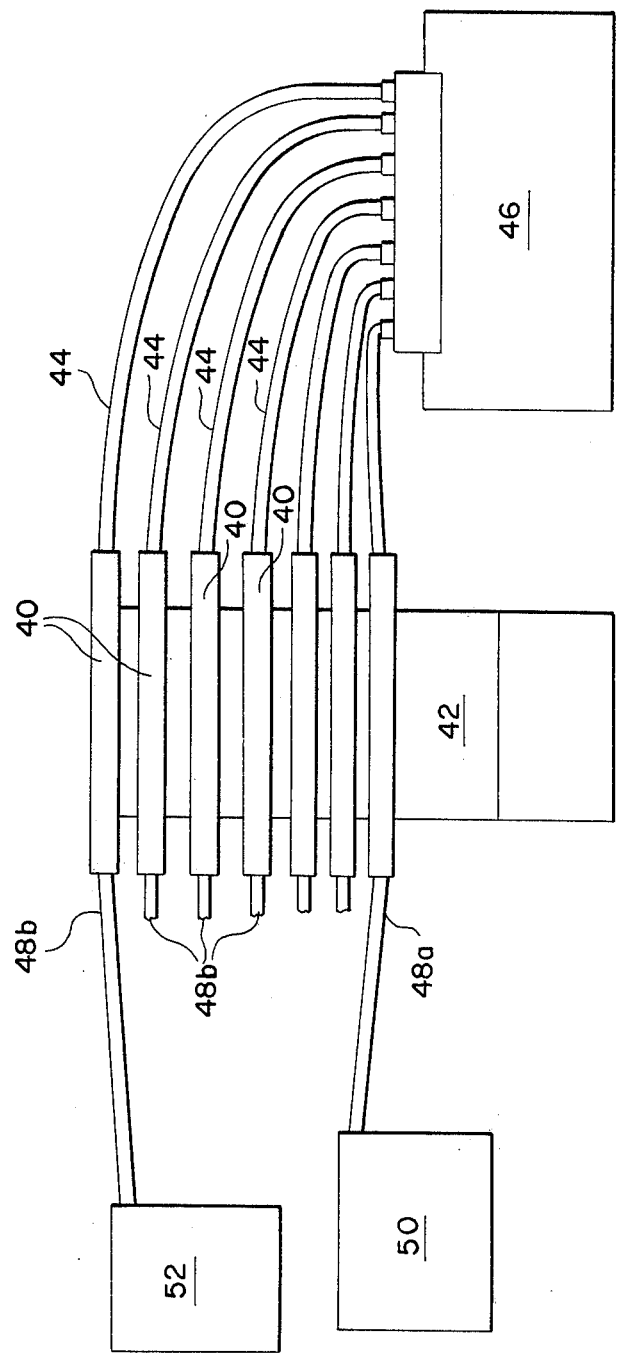
FIG. 4 is a schematic side view of a plurality of vibratory feeders connected between a pin and a spring making machine and a tumbler lock pin setting machine.

Referring to FIG. 4, a plurality of coiled vibratory feeders 40 are depicted, all mounted on a single vibratory motor 42. The discharging ends 44 of vibratory feeder 40 are connected to a tumbler lock pin setting machine, represented schematically by block 46. The charging end 48a of one of feeders 40 is connected to a spring making machine, represented schematically by block 50. Machine 50 can produce as many as 140 springs per minute, and enough springs must be stored on the feeder 40 connected thereto to supply the daily operational needs of pin setter 46, which could be as many as 20,000 springs.

The remaining feeders 40 are connectable by their charging ends 48b to a pin making machine also referred to as a screw machine, and represented schematically by block 52. Screw machine 52 is capable of making a variety of shapes and lengths of pins and at a rate many times faster than can be used by pin setting machine 46. Consequently, screw machine 52 is adjusted to produce a certain type of pin and then is operated until one of the feeders 40 is sufficiently filled with pins. Then screw machine 52 is readjusted to produce a different type of pin and is connected to the next feeder 40 and allowed to produce pins until the feeder is sufficiently filled with pins. Thus, one feeder after the other is filled or refilled with a certain type of pin. One screw machine 52 with the aid of the storage capacity of vibratory feeders 40 can supply both the variety and quantities of pins needed for pin setting machine 46. As is evident from FIG. 4, more springs and pins can be stored in a more confined space using a plurality of vibratory feeders 40 than can be stored in prior art feeders. Additionally, feeders 40 preserve the orientation of the pins and springs and prevent tangling of the springs.

Although the present invention has been described relative to exemplary embodiments thereof, it will be understood by those skilled in the art that variations and modifications can be effected in these embodiments without departing from the scope and spirit of the invention. As one modification, instead of forming the tubular passageway by coiling an elongated tube, one can form the coiled, elongated passageway directly in a solid block of material by known molding or machining techniques.

I claim:
1. A vibratory feeder for individually feeding workpieces comprising:
 means defining a elongated enclosed tubular passageway arranged as a plurality of generally concentric coil turns, said tubular passageway including a charging end and a discharging end for receiving and discharging workpieces, respectively;
 connecting means for integrally connecting substantially all of said turns of the passageway to each other so as to form an essentially rigid, integral body which includes said turns; and
 means for connecting said body to a vibrating means for vibrating said body asymmetrically about an axis, the workpieces being movable through the passageway about said axis by the asymmetric vibrations from the charging end to the discharging end and discharged individually therefrom.

2. A vibratory feeder according to claim 1, said elongated tubular passageway comprising an elongated tube coiled into a bundle having a plurality of generally concentric turns, and said connecting means comprising a bonding material located in the interstices of the coil turns and engaging substantially all of the coil turns.

3. A vibratory feeder in accordance with claim 2 wherein said charging end and said discharging end of said elongate tube extend generally outwardly from the outer periphery of said concentric coils.

4. A vibratory feeder in accordance with claim 2 wherein said coils are mounted on a generally disc-shaped base so as to be adjacent the outer peripheral portion of said base, said vibrating means is a vibratory motor arranged to circumferentially vibrate said coils about the said axis by alternating strong forward pulses and weaker return pulses so that the workpieces progress therethrough from said charging end to said discharging end.

5. A vibratory feeder in accordance with claim 2 including a base, and wherein said coils are fixedly attached to said base by a plurality of bracket members.

6. A vibratory feeder in accordance with claim 2 wherein said bundle of coils is substantially embedded in a mass of said bonding material, said mass of bonding material being generally donut-shaped.

7. A vibratory feeder in accordance with claim 2 wherein said bonding material is selected from the group consisting of resin, liquid plexiglass, and plaster.

8. A vibratory feeder in accordance with claim 1, including a plurality of said vibratory feeders arranged in stacked relationship to each other and operatively connected to a single vibrating means.

9. A vibratory feeder in accordance with claim 4 including a plurality of said vibratory feeders arranged in stacked relationship to each other and operatively connected to a single vibrating means, wherein the base of each but the lowest feeder of the stack engages the bundle of coils of the feeder located immediately beneath it.

10. A vibratory feeder in accordance with claim 2 including a base, said bundle mounted on the base, and wherein said vibrating means is a vibratory motor attached to the side of the base opposite from the side to which the coils are attached.

11. In combination with a tumbler lock pin setting machine and a tumbler lock pin making machine, a vibratory feeder for storing a plurality of pins from said pin making machine and for individually feeding the pins to said pin setting machine, said vibratory feeder including:

means defining a elongated, enclosed tubular passageway arranged as a plurality of generally concentric coil turns, and tubular passageway including a charging end and a discharging end for receiving and discharging workpieces, respectively;

connecting means for integrally connecting substantially all of said turns of the passageway to each other so as to form an essentially rigid integral body which includes said turns; and means for connecting said body to a vibrating means for vibrating said body asymmetrically about an axis, the workpieces being movable through the passageway about said axis by the asymmetric vibrations from the charging end to the discharging end and discharged individually therefrom.

12. A combination in accordance with claim 11 wherein said elongated tubular passageway comprises an elongated tube coiled into a bundle having a plurality of generally concentric turns, and said connecting means comprising a bonding material located in the interstices of the coil turns and engaging substantially all of the coil turns.

13. A combination in accordance with claim 11 including a plurality of said elongate tube feeders, each having a plurality of concentric coils, said coils stacked coaxially on said axis, and said charging ends connectable, one at a time, to said pin making machine.

14. A combination in accordance with claim 12 further including a tumbler lock spring making machine and vibratory feeders for storing springs with a charging end for receiving springs from said spring maker and with a discharging end for individually feeding the springs to said tumbler lock pin setting machine.

* * * * *